(12) United States Patent
Takai et al.

(10) Patent No.: US 8,454,445 B2
(45) Date of Patent: Jun. 4, 2013

(54) POWER TRANSMISSION

(75) Inventors: Kazuhiko Takai, Isesaki (JP); Sueji Hirawatari, Ashikaga (JP); Toshiki Fukasawa, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 306 days.

(21) Appl. No.: 12/602,477

(22) PCT Filed: May 20, 2008

(86) PCT No.: PCT/JP2008/059201
§ 371 (c)(1),
(2), (4) Date: Jul. 23, 2010

(87) PCT Pub. No.: WO2008/146653
PCT Pub. Date: Dec. 4, 2008

(65) Prior Publication Data
US 2010/0298091 A1   Nov. 25, 2010

(30) Foreign Application Priority Data

May 29, 2007 (JP) .................................. 2007-141605

(51) Int. Cl.
*F16D 9/04* (2006.01)
(52) U.S. Cl.
USPC ........................................... 464/32; 474/902
(58) Field of Classification Search
USPC ...... 464/32, 33; 474/70, 902; 403/2; 417/319
See application file for complete search history.

(56) References Cited

U.S. PATENT DOCUMENTS

| | | | | |
|---|---|---|---|---|
| 1,498,281 A | * | 6/1924 | Jones ............................. | 464/33 |
| 4,097,161 A | * | 6/1978 | Weiss et al. ........................ | 403/2 |
| 4,859,156 A | | 8/1989 | Kikuchi | |
| 2010/0144450 A1 | * | 6/2010 | Takai et al. ...................... | 464/32 |
| 2010/0183359 A1 | * | 7/2010 | Takai ................................. | 403/2 |

FOREIGN PATENT DOCUMENTS

| | | | |
|---|---|---|---|
| JP | H06-039105 U | | 5/1994 |
| JP | H08-284824 A | | 10/1996 |
| JP | H11-190361 A | | 7/1999 |
| JP | 2001-159455 A | | 6/2001 |
| JP | 2005-273677 A | | 10/2005 |
| JP | 2008-064173 A | * | 3/2008 |

OTHER PUBLICATIONS

Japanese Patent Office, International Search Report for International Application No. PCT/JP2008/059201, dated Jun. 17, 2008.

* cited by examiner

*Primary Examiner* — Gregory Binda
(74) *Attorney, Agent, or Firm* — Baker Botts L.L.P.

(57) ABSTRACT

A power transmission in which a driven body and a drive body for driving the driven body are rotated in the same direction and are coupled through a coupling portion, transmission of torque from the drive body is interrupted when the driving load of the driven body exceeds a predetermined level, and the coupling portion is constituted by combining members different from each other of a positive torque transmission member for transmitting torque in the direction of forward rotation and interrupting transmission of torque from the drive body by its own fracture when the driving load of the driven body exceeds the predetermined level and a negative torque transmission member capable of transmitting torque in the direction of reverse rotation. At a contact portion between the positive torque transmission member and the negative torque transmission member, interposed is a surface layer composed of a different kind of material from a material composing the positive and negative torque transmission members. Reliability and durability of the power transmission can be improved by preventing occurrence of melt-adhesion, abrasion or rust at the contact portion between the members constituting the coupling portion.

5 Claims, 3 Drawing Sheets

(A)

(B)

POWER TRANSMISSION

CROSS-REFERENCE TO RELATED APPLICATIONS

This application is the National Stage of International Patent Application No. PCT/JP2008/059201, filed May 20, 2008, which claims the benefit of Japanese Patent Application No. 2007-141605, filed May 29, 2007, the disclosures of which are incorporated herein by reference in their entirety.

TECHNICAL FIELD OF THE INVENTION

The present invention relates to a power transmission, for example, to a power transmission suitable to transmit driving force from a vehicle engine to a device mounted in the vehicle (e.g. a compressor used in an air conditioning system for the vehicle).

BACKGROUND ART OF THE INVENTION

As a conventional technology, a fracture-type torque limiter which has a member or a portion to be fractured when a transmission load over a predetermined value is provided between a member at the driving side and a member at the driven side. For example, in Patent document 1, a fracture-type torque limiter is disclosed wherein, when a compressor is abnormally stopped by a failure, etc., a coupling member which is provided between a pulley at the drive source side and a rotation transmission plate attached to a shaft of the compressor at the driven side is fractured. In the conventional fracture-type torque limiter, however, because fluctuation load due to torque fluctuation entirely acts on the part or the member to be fractured, fatigue phenomenon occurs at this portion, and therefore, it may be fractured at a torque lower than a target fracture torque.

For such a problem, a power transmission, in which a drive body and a driven body rotated in the same direction are coupled through a coupling portion, is known and, by forming the coupling portion from members different from each other, the fatigue phenomenon of the part to be fractured, that has been a problem in the conventional technology, is decreased, and the target torque interruption can be securely achieved (Japanese Patent Application 2006-241277).

According to this previously proposed invention, the above-described the coupling portion is constituted by combination of a positive torque transmission member for transmitting torque in a direction of forward rotation and interrupting transmission of torque by its own fracture when the driving load of the driven body exceeds a predetermined level and a negative torque transmission member capable of transmitting torque in a direction of reverse rotation, and by providing pre-tensions to the above-described positive torque transmission member and the above-described negative torque transmission member in directions opposite to each other, namely, by providing a tensile pre-load and a compressive pre-load thereto, the tensile pre-load and the compressive pre-load can operate in directions opposite to each other when the amplitude of torque fluctuation is decreased, and the amplitude of torque fluctuation can be efficiently decreased. Therefore, by this previous proposal, the conventional problems can be solved, thereby realizing a power transmission having an excellent reliability.

Patent document 1: Japanese Utility Model 6-39105

DISCLOSURE OF THE INVENTION

Problems to be Solved by the Invention

However, room for further improvement are left even in the above-described previous proposal. Namely, in the previous proposal, because a structure is employed wherein the positive torque transmission member and the negative torque transmission member are coupled to each other, at the time of torque transmission, a relative fine vibration may occur between the surfaces to be contacted with each other between both members. If such a relative fine vibration occurs, the surfaces of the negative torque transmission member composed of a metal and the positive torque transmission member similarly composed of a metal are heated, both members may be melt-adhered or abraded. Further, if there occurs a rust on the surface of the negative torque transmission member or the positive torque transmission member, both members may be temporarily fixed to each other. Thus, if any of such melt-adhesion, abrasion, rust, etc, occurs, it may cause a dispersion of the torque to be interrupted, and target torque interruption may not be achieved securely.

Accordingly, based on the above-described previous proposal having solved problems in the conventional power transmission as aforementioned, in order to solve the left problems in the previous proposal as described above, an object of the present invention is to provide a power transmission which can further improve the reliability and durability by preventing occurrence of melt-adhesion, abrasion, rust, etc. at a contact portion between members.

Means for Solving the Problems

To achieve the above-described object, a power transmission according to the present invention in which a driven body and a drive body for driving the driven body are rotated in the same direction and are coupled through a coupling portion, torque of the drive body is transmitted to the driven body, transmission of torque from the drive body is interrupted when a driving load of the driven body exceeds a predetermined level, and the coupling portion is constituted by combining members different from each other of a positive torque transmission member for transmitting torque in a direction of forward rotation and interrupting transmission of torque from the drive body by its own fracture when the driving load of the driven body exceeds the predetermined level and a negative torque transmission member capable of transmitting torque in a direction of reverse rotation, is characterized in that a surface layer composed of a different kind of material from a material composing the positive and negative torque transmission members is interposed at a contact portion between the positive torque transmission member and the negative torque transmission member.

Namely, the alternate load of the positive torque and the negative torque is not received by only one member, but the respective loads are received by the positive torque transmission member and the negative torque transmission member formed from members different from each other which are provided with characteristics different from each other, and first, by this structure, occurrence of fatigue phenomenon generating on only one member by the alternate load is suppressed, it becomes possible to avoid that a torque transmitting member is fractured by a torque much smaller than a target interruption torque value. In addition, by interposing a surface layer composed of a different kind of material from a material composing the positive and negative torque transmission members (including both of a surface layer composed of the different kind of material and a surface layer provided with a different kind of property by a treatment) at the contact portion in the coupling portion which is constituted by combination of the positive torque transmission member and the negative torque transmission member, it becomes possible to appropriately prevent occurrence of melt-adhesion, abrasion, rust, etc. at the contact portion between both members, and whereby, it becomes possible to further improve the reliability and the durability of the power transmission.

In this power transmission according to the present invention, the above-described surface layer may be formed, for example, from a resin layer. The resin layer is preferably composed of, for example, a fluorine-group resin low in coefficient of friction and high in thermal resistance.

Further, the above-described surface layer may be formed as a nitrided layer. This nitrided layer can be formed by applying a direct nitriding treatment, for directly nitriding the surface of a material forming a member, to at least one of the positive torque transmission member, the negative torque transmission member, and a member interposed therebetween.

Furthermore, the above-described surface layer may be formed from a plated layer. As the plated layer, for example, a layer plated with zinc, nickel, chrome or an alloy thereof can be employed.

In such a power transmission according to the present invention, it is preferred that pre-tensions in directions opposite to each other are provided to the above-described positive torque transmission member and the above-described negative torque transmission member at an assembly condition thereof. By providing such pre-tensions, because the respective pre-tensions act in directions opposite to each other when the amplitude of torque fluctuation is decreased, the amplitude of torque fluctuation can be decreased more effectively.

Effect According to the Invention

Thus, in the power transmission according to the present invention, even in case where there is a torque fluctuation in the side of a drive source or the drive body, for example, even in case where there is a fluctuation of an engine, it becomes possible to suppress its influence as little as possible, and occurrence of fatigue of the material at the coupling portion can be suppressed and the interruption of torque can be performed accurately at a target interruption torque value. Further, since the surface layer composed of a different kind of material from a material composing the positive and negative torque transmission members is interposed at the contact portion between the positive torque transmission member and the negative torque transmission member thereby appropriately preventing occurrence of melt-adhesion, abrasion, rust, etc. at the contact portion, a power transmission high in reliability and durability can be realized.

EXPLANATION OF SYMBOLS

Figure 1:
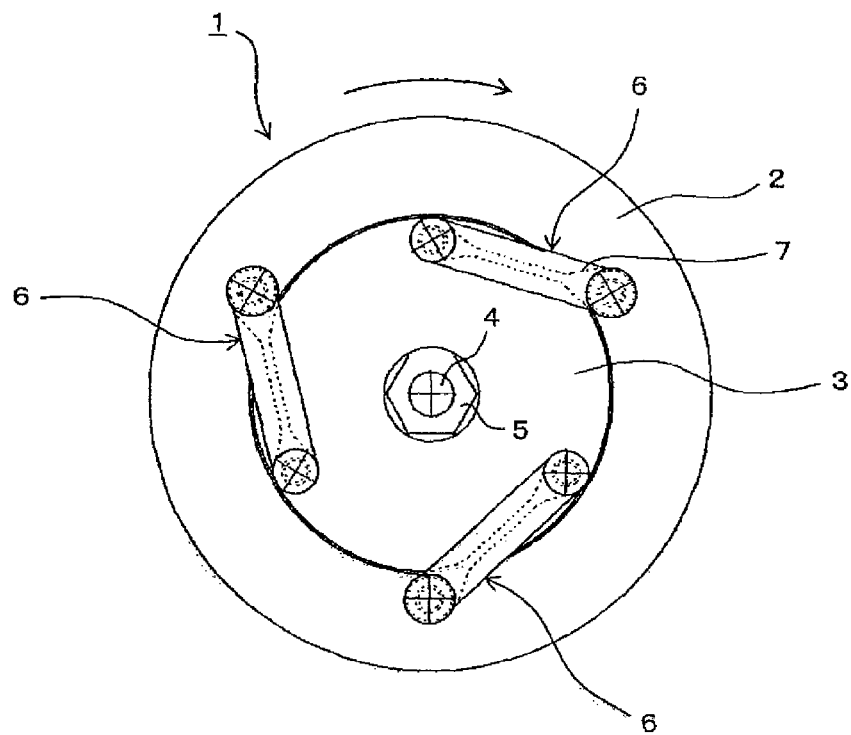
FIG. 1 is an elevational view of a power transmission according to an embodiment of the present invention.

1: power transmission
2: pulley as drive body
3: hub as driven body
4: main shaft of compressor
5: nut
6: coupling portion
7a, 7b: pin or rivet
8: positive torque transmission member
9a, 9b: sleeve
10: collar
11: negative torque transmission member
12: end surface of negative torque transmission member
13, 14: surface layer

THE BEST MODE FOR CARRYING OUT THE INVENTION

Hereinafter, desirable embodiments of the present invention will be explained referring to figures.

FIG. 1 shows a power transmission according to an embodiment of the present invention. In FIG. 1, numeral 1 indicates the entire power transmission, and power transmission 1 has pulley 2 as a drive body, for example, transmitted with a driving force from an engine, and hub 3 as a driven body, for example, connected and fixed to the end portion of main shaft 4 of a compressor via nut 5, which are rotated in the same direction (arrow direction in FIG. 1). These pulley 2 and hub 3 are coupled through coupling portion 6, the torque of pulley 2 provided as a drive body is transmitted to hub 3 provided as a driven body, and when the driving load of the driven body exceeds a predetermined level, the torque transmission is interrupted by fracture of a member (positive torque transmission member) constituting coupling portion 6.

In this embodiment, a plurality of coupling portions 6, in particular, three sets of coupling portions 6, are disposed at an equal interval in the circumferential direction. In more detail, each coupling portion 6 is constituted by combination of a positive torque transmission member for transmitting a torque in a direction of forward rotation (arrow direction in FIG. 1) and for interrupting the torque transmission from the drive body by its own fracture when the driving load of the driven body exceeds the predetermined level, and a negative torque transmission member capable of transmitting torque in the direction of reverse rotation.

Figure 2:
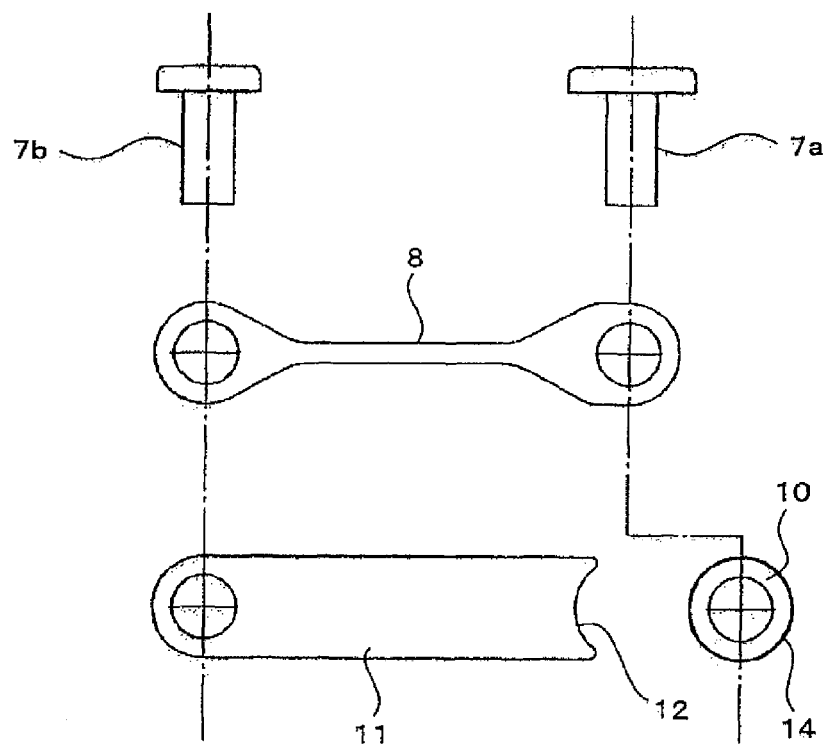
FIG. 2 is an exploded diagram of a torque transmission member sub-assembly in the power transmission depicted in FIG. 1.
Figure 3:
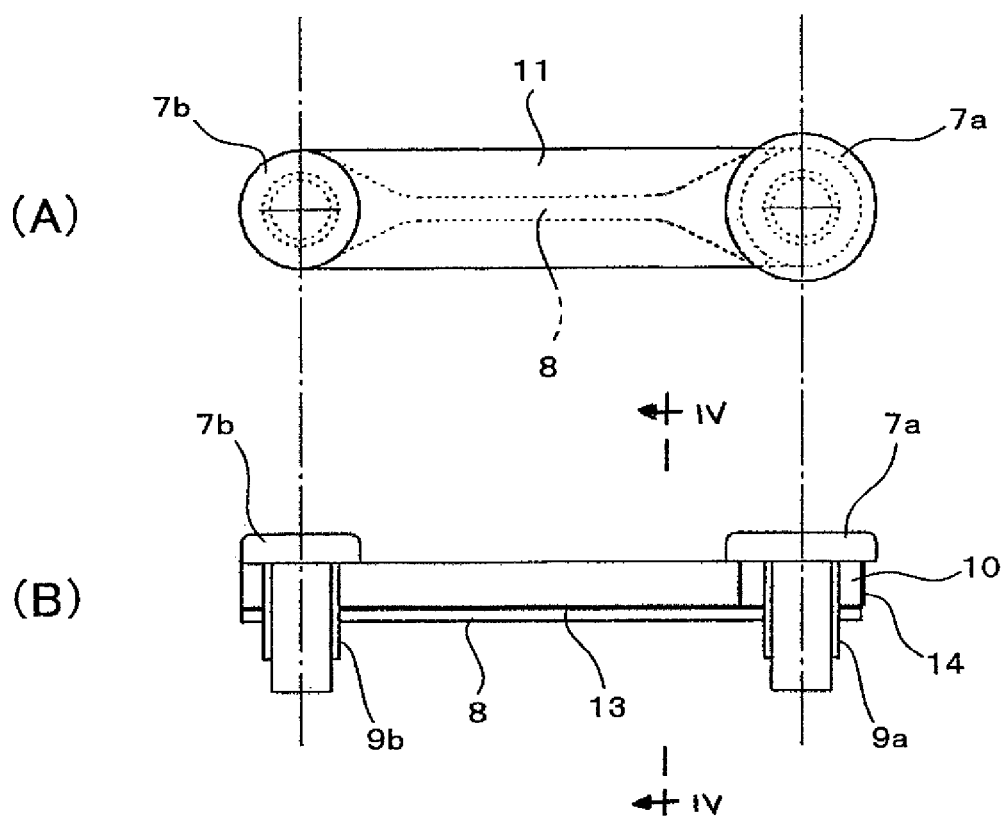
FIG. 3 shows a plan view (A) and a vertical sectional view (B) of the torque transmission member sub-assembly in the power transmission depicted in FIG. 1, showing a condition after assembling.
Figure 4:
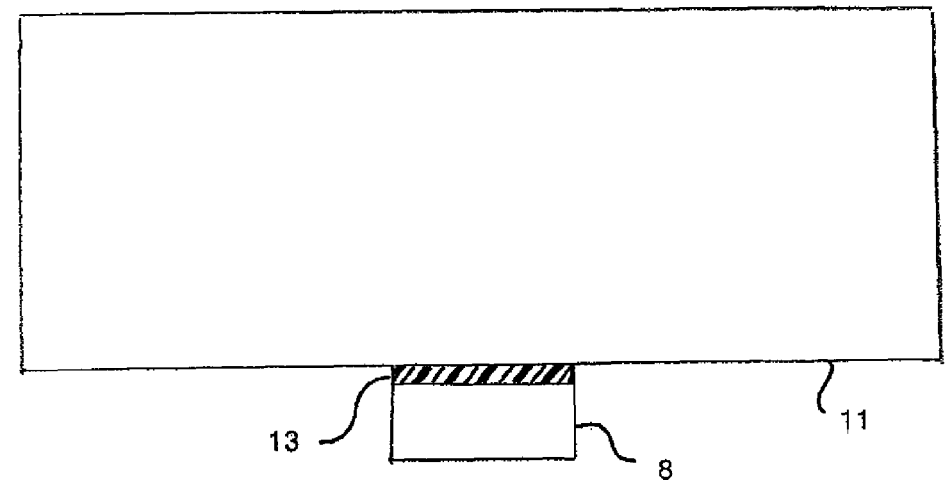
FIGS. 4A and 4B show an enlarged, cross-sectional view, along the line IV-IV, of FIG. 3, wherein the upper surface of the positive torque transmission member is covered with a surface layer comprised of a resin in FIG. 4A, and the upper surface of the positive torque transmission member is covered with a surface layer comprised of a metal, such as a nitrided layer or a plated layer, in FIG. 4B.
Figure 4:
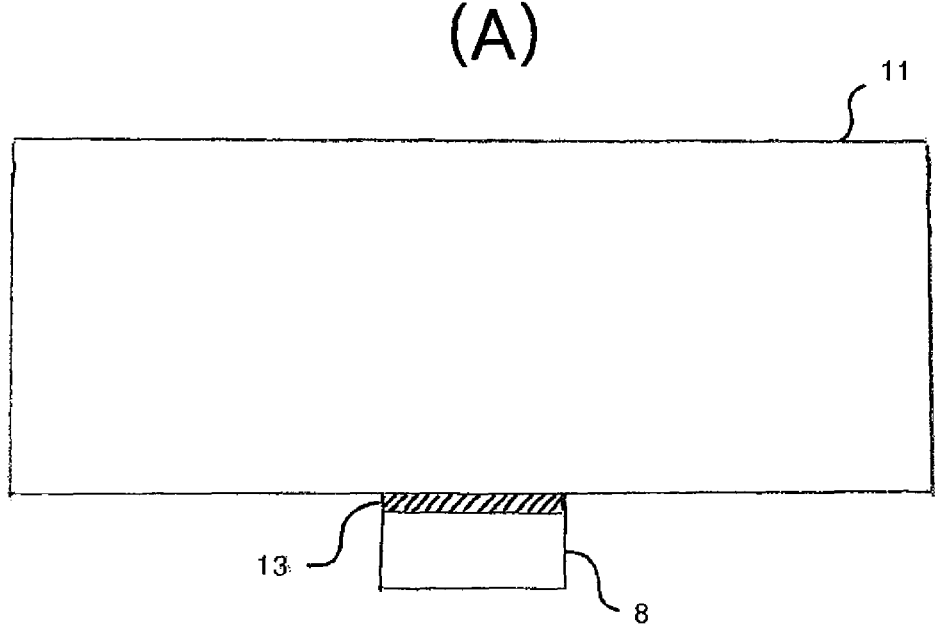

In this embodiment, each coupling portion 6 is formed by assembling the respective members integrally as a torque transmission member sub-assembly as depicted in FIGS. 2 and 3. Each coupling portion 6 has a positive torque transmission member 8 extending between a pin or rivet 7a connected to one of pulley 2 and hub 3 and a pin or rivet 7b connected to the other, sleeves 9a, 9b fitted on the outer circumferences of pins or rivets 7a, 7b, a collar 10 fitted on the outer circumference of sleeve 9a, and a negative torque transmission member 11 whose one end is fitted and connected to sleeve 9b side and an end surface 12 of the other end of which is brought into contact with the outer circumferential surface of collar 10. For these positive torque transmission member 8 and negative torque transmission member 11, at the assembly condition thereof, a pre-tension in a tensile direction is provided to positive torque transmission member 8, and a pre-tension in a compressive direction is provided to negative torque transmission member 11, and thus, pre-tensions in directions opposite to each other are provided.

In the condition where positive torque transmission member 8 and negative torque transmission member 11 are assembled as the torque transmission member sub-assembly as shown in FIGS. 2 and 3, the contact portions are formed between the lower surface of negative torque transmission member 11 and the upper surface of positive torque transmission member 8 and between the outer circumferential surface of collar 10 and end surface 12 of negative torque transmission member 11 contacted to the outer circumferential surface of collar 10. In this embodiment, a surface layer composed of a different kind of material from that of positive torques transmission member 8 and negative torque transmission member 11 according to the present invention is interposed at each of these both contact portions (however, it is also possible to employ a structure wherein such a surface layer is interposed only at any one contact portion). Particularly in this embodiment, a surface layer 13 is provided on the upper surface of positive torque transmission member 8 and a surface layer 14 is provided on the outer circumferential surface of collar 10, respectively.

Surface layer 13 may be provided on the lower surface of negative torque transmission member 11, and it may be provided on both of the upper surface of positive torque transmission member 8 and the lower surface of negative torque transmission member 11. Surface layer 14 may be provided on end surface 12 of negative torque transmission member 11, and it may be provided on both of the outer circumferential surface of collar 10 and end surface 12 of negative torque transmission member 11. Such surface layers 13, 14 are formed as any of a resin layer (preferably, a fluorine-group resin), a nitrided layer and a plated layer. Where, it is possible to form surface layers 13, 14 only on the objective contact portions, and also possible to form them over the entire surfaces of the members.

By interposing the above-described surface layers 13, 14 at the contact portions, rust of positive torque transmission member 8 and negative torque transmission member 11 and melt-adhesion between both members can be prevented, the friction coefficient at the contact portions between both members can be reduced, further, occurrence of rust at least at the contact portions can be prevented, and while a desirable torque interruption function is exhibited at respective coupling portions 6, dispersion of the interruption torque can be suppressed. By employing the structure wherein different members of positive torque transmission member 8 and negative torque transmission member 11 are combined, even in case where there is a torque fluctuation in a drive source or a drive body side, its influence can be suppressed as little as possible, and by interposition of surface layers 13, 14, torque interruption can be performed accurately at a target interruption torque value.

INDUSTRIAL APPLICATIONS OF THE INVENTION

The structure of the power transmission according to the present invention can be applied to any power transmission in which torque interruption is performed by fracture of a coupling member between a rotational drive body and a driven body, in particular, it is suitable to a case where an vehicle engine is employed as a drive source, for example, a case of transmitting a power to a compressor used in an air conditioning system for vehicles.

The invention claimed is:

1. A power transmission comprising:
a driven body,
a drive body;
wherein said drive boding drives said driven body; and
wherein said driven body and said drive body are rotated in the same direction,
a coupling portion, through which torque of said drive body is transmitted to said driven body and transmission of torque from said drive body is interrupted when a driving load of said driven body exceeds a predetermined level, comprising:
a positive torque transmission member for transmitting torque in a direction of forward rotation and interrupting transmission of torque from said drive body by fracturing when said driving load of said driven body exceeds said predetermined level and
a negative torque transmission member for transmitting torque in a direction of reverse rotation, wherein said positive torque transmission member is different from said negative torque transmission member, and
a surface layer comprised of a different kind of material from a material composing said positive and negative torque transmission members is formed integrally on a surface of at least one of said positive and negative torque transmission members and is interposed at a contact portion between said positive torque transmission member and said negative torque transmission member.

2. The power transmission according to claim 1, wherein said surface layer comprises a resin layer.

3. The power transmission according to claim 2, wherein said resin layer is composed of a fluorine-group resin.

4. The power transmission according to claim 1, wherein said surface layer comprises a nitrided layer.

5. The power transmission according to claim 1, wherein said surface layer comprises a plated layer.

* * * * *